United States Patent [19]
Showalter

[11] Patent Number: 5,839,328
[45] Date of Patent: Nov. 24, 1998

[54] DIFFERENTIAL HAVING DUAL MODULATING CLUTCHES

[75] Inventor: Dan J. Showalter, Plymouth, Mich.

[73] Assignee: Borg-Warner Automotive, Inc., Sterling Heights, Mich.

[21] Appl. No.: 900,232

[22] Filed: Jul. 24, 1997

Related U.S. Application Data

[62] Division of Ser. No. 612,626, Mar. 6, 1996, Pat. No. 5,690,002.

[51] Int. Cl.$^6$ ................................................. B60K 17/16
[52] U.S. Cl. .................................................. 74/650
[58] Field of Search .............................. 74/650, 665 H; 192/35, 49

[56] References Cited

U.S. PATENT DOCUMENTS

| | | | |
|---|---|---|---|
| 2,555,215 | 5/1951 | Warner | 192/35 |
| 2,947,393 | 8/1960 | Grover | 192/35 |
| 2,947,394 | 8/1960 | Grover | 192/35 |
| 4,681,180 | 7/1987 | Oyama et al. | 192/49 |
| 5,105,901 | 4/1992 | Watanabe et al. | 180/249 |
| 5,119,900 | 6/1992 | Watanabe et al. | 180/245 |
| 5,141,072 | 8/1992 | Shibahata | 180/245 |
| 5,152,362 | 10/1992 | Naito | 180/248 |
| 5,161,636 | 11/1992 | Haupt et al. | 74/650 |
| 5,189,930 | 3/1993 | Kameda | 74/650 |
| 5,353,889 | 10/1994 | Hamada | 180/242 |
| 5,383,378 | 1/1995 | Paul et al. | 75/640 |
| 5,417,298 | 5/1995 | Shibahata | 180/76 |
| 5,479,348 | 12/1995 | Sasaki | 364/426.03 |
| 5,484,033 | 1/1996 | Frank et al. | 180/245 |
| 5,517,417 | 5/1996 | Iida | 364/426.01 |
| 5,540,119 | 7/1996 | Hudson | 192/49 |
| 5,548,513 | 8/1996 | Masuda et al. | 364/426.03 |

*Primary Examiner*—Dirk Wright
*Attorney, Agent, or Firm*—Brinks Hofer GIlson & Lione; Greg Dziegielewski, Esq.

[57] ABSTRACT

An axle differential for the secondary driveline of a four-wheel drive vehicle includes individual modulatable axle clutches that may be commonly or individually activated to control torque delivery to the secondary drive wheels. The differential includes an input shaft driving a bevel gear set, the modulatable clutches and left and right output shafts. Each of the modulatable clutches include a disc pack clutch assembly having first and second interleaved pluralities of clutch plates, a ball ramp operator and an electromagnetic coil which acts upon the ball ramp operator which applies compressive force to the interleaved clutch plates. An operating program for controlling left-right secondary wheel slip may be utilized with the differential.

19 Claims, 4 Drawing Sheets

DIFFERENTIAL HAVING DUAL MODULATING CLUTCHES

CROSS REFERENCE TO CO-PENDING APPLICATION

This application is a divisional application of Ser. No. 08/612,626, filed Mar. 6, 1996 now U.S. Pat. No. 5,690,002, granted.

BACKGROUND OF THE INVENTION

The invention relates to motor vehicle differentials and more specifically to a differential having individual modulatable axle clutches for disposition in the secondary driveline of a four-wheel drive vehicle.

The sophistication of consumer four-wheel drive vehicles and drive system continues to increase. Initially, four-wheel drive systems were confined to trucks and vehicles primarily intended for off-road use. Such systems were both complex from a mechanical standpoint and complicated from an operational standpoint. Invariably it was necessary to stop the vehicle to place the drive train into four-wheel drive and furthermore necessary to dismount the vehicle and manually activate drive hubs to couple the drive wheels to the drive axles.

Simultaneously, the application of such systems expanded to light duty trucks, sport utility vehicle vans and even some passenger cars as the systems became more sophisticated, simplified and easier to use. Such systems could often be activated on the fly and axle disconnects incorporated in the front differential obviated the necessity of dismounting the vehicle to lock or unlock the wheel mounted hubs.

The current generation of four-wheel drive vehicles may be characterized as including adaptive drive systems wherein axle and wheel speed sensors provide data to a controller which selectively delivers torque or, contrariwise, applies braking to control wheel slip, that is, front to rear speed differentials in order to improve the driveability of such vehicles. The drivelines of such adaptive vehicle drive systems generally include a transfer case driven by the vehicle transmission which, through a modulating electromagnetic or hydraulically operated clutch, shifts torque delivery between the primary driveline and wheels and secondary driveline and wheels. Typically, under conditions of no slip the primary driveline, which is coupled to and drives either the front or rear wheels of the vehicle, will carry and deliver substantially the full torque output of the transmission. When wheel slip is sensed, the clutch increasingly couples the two drivelines, thereby transferring torque to the secondary driveline and wheels. When the modulating clutch is fully engaged, a fifty-fifty torque split will exist between the primary and secondary drivelines.

Such systems commonly include front and rear differentials which operate conventionally to accommodate left-right speed differences at only 140 the front and rear axles. Thus, such adaptive drive systems do not address driving situations or handling improvements relating to left-right speed differences.

As part of the increasing sophistication of adaptive drive systems, attention is now being paid to the problem of such left-right speed differences and moreover the ability to control same to improve the handling characteristics and driveability of vehicles. The invention herein is directed to these goals.

SUMMARY OF THE INVENTION

An axle differential for the secondary driveline of a four-wheel drive vehicle includes individual modulatable axle clutches that may be commonly or individually activated to control torque delivery to the secondary drive wheels. The differential includes an input shaft driving a bevel gear set, the modulatable clutches and left and right output shafts. Each of the modulatable clutches include a disc pack clutch assembly having first and second interleaved pluralities of clutch plates, a ball ramp operator and an electromagnetic coil which acts upon the ball ramp operator which applies compressive force to the interleaved clutch plates. A microprocessor operating program for controlling left-right secondary wheel slip may be utilized with the differential. The differential of the present invention eliminates the need for convention gearing in the differential.

Thus it is an object of the present invention to provide an axle differential having two individual modulatable clutches driving left and right output shafts.

It is a further object of the present invention to provide an axle differential having a pair of modulatable axle clutches that may be commonly or individually activated.

It is a still further object of the present invention to provide an axle differential having an input shaft, a bevel gear set, a pair of modulating clutches and left and right output shafts.

It is a still further object of the present invention to provide an axle differential which does not include a conventional differential gear set.

It is a still further object of the present invention to provide an axle differential having a pair of modulatable clutches each including a disc pack clutch assembly and a ball ramp operator.

Further objects and advantages of the present invention will become apparent by reference to the following description of the preferred embodiment and appended drawings wherein like numbers refer to the same element, feature or component.

DESCRIPTION OF THE PREFERRED AND ALTERNATE EMBODIMENTS

Figure 1:
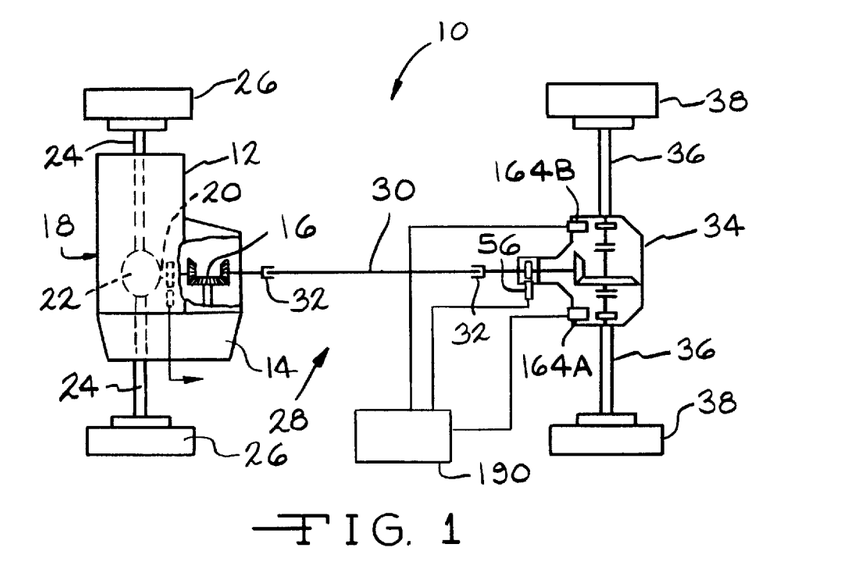
FIG. 1 is a diagrammatic view of a vehicle drive system for a four-wheel vehicle incorporating the dual clutch secondary driveline differential of the present invention.

Referring now to FIG. 1, an adaptive four-wheel vehicle drive train is diagrammatically illustrated and designated by the reference numeral 10. The four-wheel vehicle drive train 10 includes a prime mover 12 which is coupled to and directly drives a transaxle 14. The output of the transaxle 14 drives a beveled or spiral beveled gear set 16 which provides motive power to a primary or front driveline 18 comprising a front or primary propshaft 20, a front or primary differential 22, a pair of live front axles 22 and respective pair of front or primary tire and wheel assemblies 26. The beveled or spiral beveled gear set 16 also provides motive power to a secondary or rear driveline 28 comprising a secondary propshaft 30 having appropriate universal joints 32, a rear or secondary differential 34, a pair of live secondary or rear axles 36 and a respective pair of secondary or rear tire and wheel assemblies 38.

The foregoing description relates to a vehicle wherein the primary driveline 18 is disposed at the front of the vehicle and, correspondingly, the secondary driveline 28 is disposed at the rear of the vehicle, such a vehicle commonly referred to as a front wheel drive vehicle. The designations "primary" and "secondary" herein refer to drivelines providing drive torque at all times and drivelines providing supplemental or intermittent torque, respectively. These designations (primary and secondary) are utilized rather than front driveline and rear driveline inasmuch as the invention herein disclosed and claimed may be readily utilized with vehicles wherein the primary driveline 18 is disposed at the rear of the vehicle and the secondary driveline 28 and components within the secondary differential 34 are disposed at the front of the vehicle. Thus, the illustration in FIG. 1, wherein the primary driveline 18 is disposed at the front of the vehicle should be understood to be illustrative rather than limiting and that the components and arrangement of components illustrated is equally suitable and usable with a primary rear wheel drive vehicle.

Figure 2:
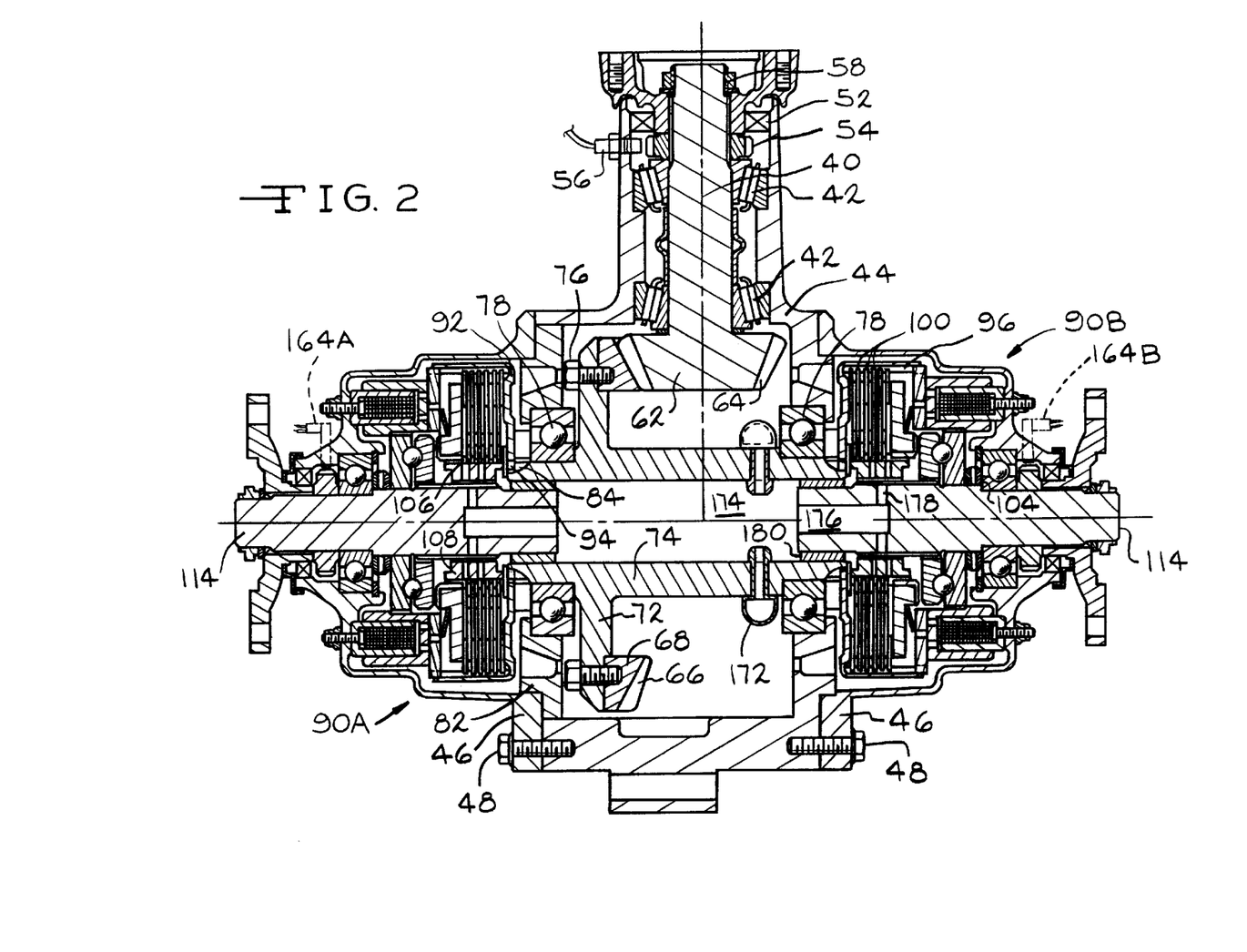
FIG. 2 is a full, sectional view of a dual clutch differential according to the present invention.

Referring now to FIGS. 1 and 2, the secondary differential 34 includes an input shaft 40 supported for rotation on suitable roller bearing assemblies 42 within a center housing 44. At each end of the center housing 44 is a bell housing 46 which is secured to the center housing 44 by a plurality of fasteners 48, two of which are illustrated in FIG. 2. Appropriately disposed oil seals 52 provide an appropriate fluid-tight seal between the input shaft 40 and the housing 44. A tone wheel 54 is also secured for rotation to the input shaft 40 and rotates therewith. A sensor 56 such as a variable reluctance or Hall effect sensor extends through the center housing 44 and senses rotation of the tone wheel 54. The input shaft 40 may also include male splines or other similar features which facilitate coupling to a universal joint 32 or other shaft or stub shaft which drives the input shaft 40.

The input shaft 40 terminates in a bevel gear 62 having gear teeth 64 which mate with complementarily configured gear teeth 66 on a ring gear 68 secured to a flange 72 on a centrally disposed tubular drive member 74 by suitable fasteners 76. The tubular drive member 74 is supported by a pair of anti-friction bearings such as the ball bearing assemblies 78 which are seated within the center housing 44 or an annular spacer 82 disposed within the center housing 44. At each end of the tubular drive member 74 are sets of male splines or gear teeth 84. Within each of the pair of bell housings 46 is a respective one of a pair of modulating clutch assemblies 90A and 90B. But for the opposed, mirror-image arrangement of the two modulating clutch assemblies 90A and 90B, the components of the two clutch assemblies 90A and 90B described below they are identical and thus only the modulating clutch assembly 90B disposed on the right of FIG. 2 and in FIG. 3 will be fully described, it being understood that the left modulating clutch assembly 90A is in all significant respects identical to the right modulating clutch 90A.

Figure 3:
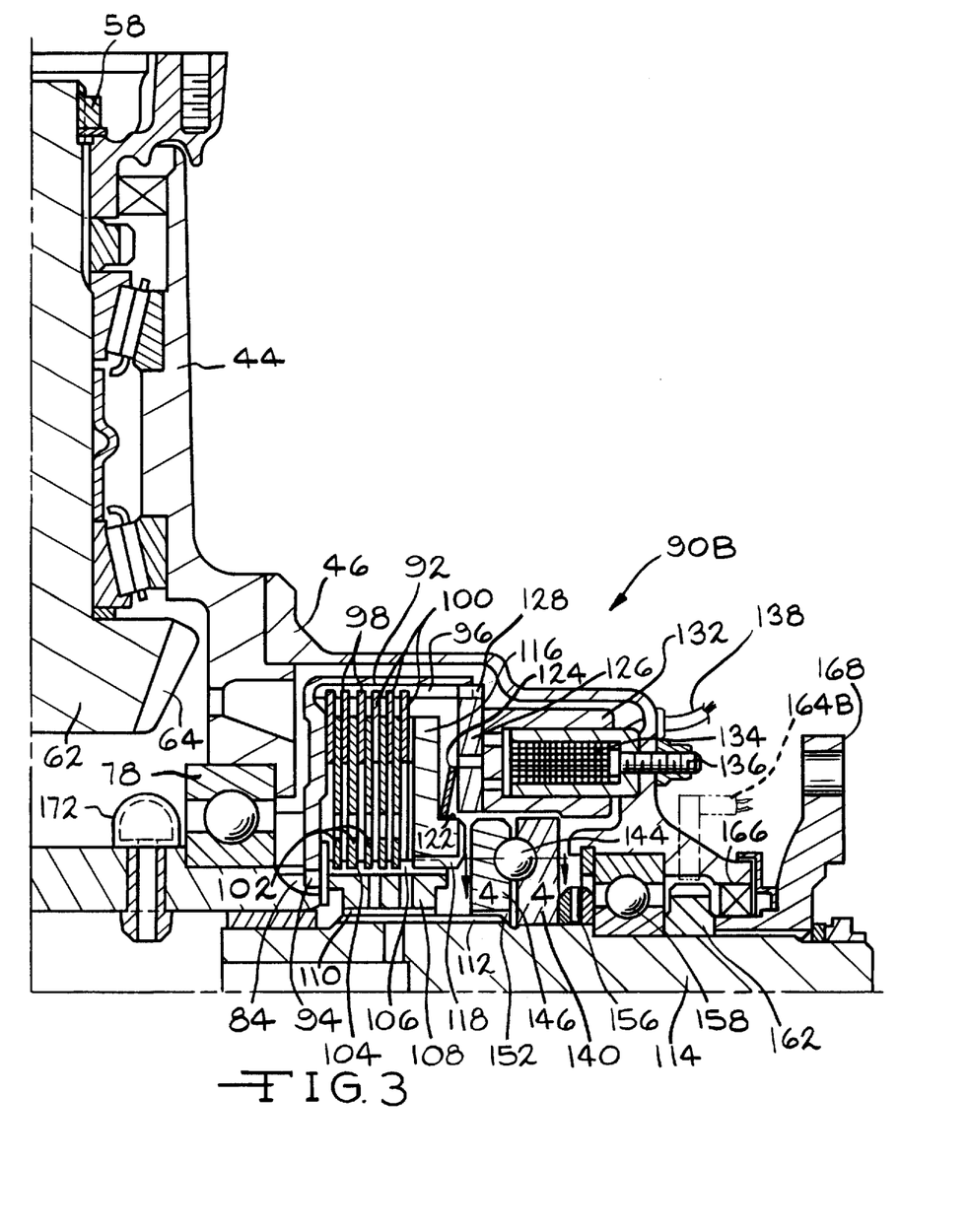
FIG. 3 is an enlarged, sectional view of a portion of a dual clutch differential according to the present invention.

Each of the modulating clutch assemblies 90A and 90B include a clutch end bell 92. The clutch end bells 92 are identical but disposed in a mirror image relationship on opposite ends of the tubular drive member 74. Each of the clutch end bells 92 includes a plurality of female splines or gear teeth 94 formed in the end wall which are complementary to the male splines or gear teeth 84 on the tubular drive member 74. The interior, circumferential surface of the bell housing 92 defines a plurality of axially extending female splines 96 which are engaged by and rotationally drive complementary male splines 98 disposed on a first plurality of clutch plates 100. The first plurality of clutch discs or plates 100 include suitable frictional material and surfaces and are interleaved with a second, smaller diameter plurality of clutch discs or plates 102 also including suitable frictional material and surfaces and having female splines 104 which engage and rotationally drive complementary male splines 106 disposed upon a clutch collar 108. The clutch collar 108 in turn includes female splines or gear teeth 110 which mate with complementarily configured male splines or gear teeth 112 disposed on the output shaft 114B.

The disc pack clutch assembly 90B also includes a circular apply plate 116 which includes internal splines or gear teeth 118 which mate with the male splines 106 on the clutch collar 108. The apply plate 116 thus rotates with the second plurality of clutch plates 102 and may move axially relative thereto. The apply plate 116 includes a shoulder 122 which positions and receives a Belleville spring 124. The Belleville spring provides a compressive preload or bias to the first and second pluralities of clutch plates 100 and 102 such that a nominal maximum torque of 150 pounds-feet may be transmitted through the clutches 90A and 90B before slip occurs. The maximum torque threshold through each clutch assembly 90A and 90B may be adjusted up or down by 50% or more, e.g., 75 pounds-feet to 225 pounds-feet, to suit typical automotive, 4WD vehicle and SUV applications.

The Belleville spring 124 is disposed between the apply plate 116 and an armature 126. The armature 126 include male splines or gear teeth 128 about its periphery which are complementary to and engage the female splines 96 on the interior of the end bell 92. Thus, the armature 126 rotates with the end bell 92 and the first plurality of clutch plates 100. The armature 126 is disposed adjacent a U-shaped circular coil housing 132. The coil housing 132 generally surrounds a stationary electromagnetic coil 134 which is secured to the housing end bell 46 by a plurality of threaded studs and fasteners 136. Electrical energy may be provided to the electromagnetic coil 134 through a conductor 138.

Coupled to the coil housing 132 by any suitable means such as weldments, interengaging splines or an interference fit is a first circular member 140. The first circular member 140 defines a loose, freely rotating fit about the output shaft 114B and thus the first circular member 140 and the coil housing 132 are free to rotate about both the output shaft 114B and the electromagnetic coil 134. The first circular member 140 includes a plurality of ramp-like recesses 142 arranged in a circular pattern about the axis of the output shaft 114B. The recesses 142 represent an oblique section of a helical torus. Disposed within each of the recesses 142 is a load transferring ball 144 or similar load transferring member which rolls along the ramps defined by the oblique surfaces of the recesses 142. A second circular member 146 is disposed in opposed relationship with the first circular member 140 and includes a like plurality of complementarily sized and arranged recesses 148. The load transferring balls 144 are thus received and trapped within the pairs of opposing recesses 142 and 148, the ends of the recesses being curved and much steeper in slope than the interior regions of the recesses 142 and 148 such that the load transferring balls 144 are effectively trapped in the regions defined thereby.

Figure 4:
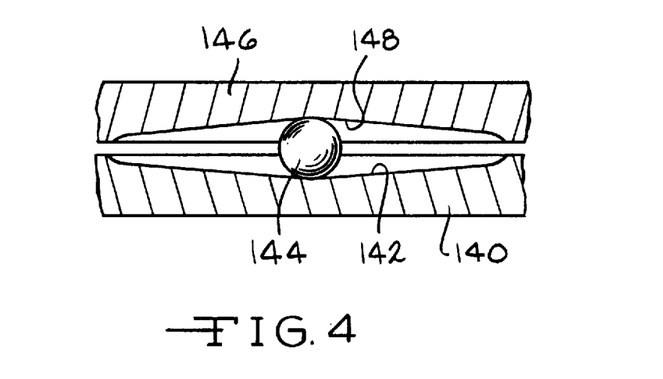
FIG. 4 is a flat pattern development of the ball ramp operators of the clutch according to the present invention taken along line 4—4 of FIG. 3.

It will be appreciated that the recesses 142 and 148 and the load transferring balls 144 may be replaced with other analogous mechanical elements which cause axial displacement of the circular members 140 and 146 in response to relative rotation therebetween. For example, tapered rollers disposed in complementarily configured conical helices may be utilized.

An important design consideration of the recesses 142 and 148 and the load transferring balls 144 is that the geometry of their design and the design of the Belleville spring 124 and the clearances in the clutch assembly overall ensure that the clutch assemblies 90A and 90B are not self-locking. The electromagnetic clutch assemblies 90A and 90B must not self-engage but rather must be capable of modulating clamping of the clutch plates 100 and 102 and torque transfer in direct, proportional response to the input to the electromagnetic coil 134.

The second circular member 146 includes a plurality of female splines or gear teeth 152 which are complementary to and engage the male splines or gear teeth 112 on the output shaft 114. The axial position of the first circular member 140 is established by a thrust bearing 156 which is disposed adjacent a ball bearing assembly 158. Each of the output shafts 114A and 114B include a tone wheel 162A and 162B. Disposed in adjacent, sensing relationship with each of the tone wheels 162A and 162B is a variable reluctance or Hall effect sensor 164A and 164B. The sensors 164A and 164B provide signals which may be utilized by suitable electronic equipment to compute the speed of the left and right output shafts 114A and 114B, respectively. Oil seals 166 are also disposed between the output shafts 114A and 114B and the housing end bells 46. Finally, output flanges 168 may be secured by suitable splines or other interconnecting means to the output shafts 114 to facilitate coupling of the output shafts 114 to associated components in the rear axles 36 of the secondary driveline 28.

In order to provide appropriate cooling for the components of the secondary driveline differential 34 and specifically of the modulating clutch assemblies 90A and 90B, the interior portion of the housing 44 forms a sump within which a lubricating and cooling fluid may be disposed. A pair of scavengers or scoops 172 having a mouth open toward the forward direction of rotation of the tubular drive member 74 extend radially therefrom. As the tubular drive member 74 rotates, the scoops 172 collect and drive lubricating and cooling fluid inwardly to a centrally dispose, hollow chamber 174 in the tubular drive member 74. Fluid then travels through axial passageways 176 in the output shafts 114 and thence through radial passageways 178 and into the region of the differential 34 occupied by the modulating clutch assemblies 90A and 90B. Heat generated in the modulated clutch assemblies 90A and 90B is thus transferred to the circulating lubricating and coolant fluid and dispersed throughout the secondary differential 34.

Figure 5:
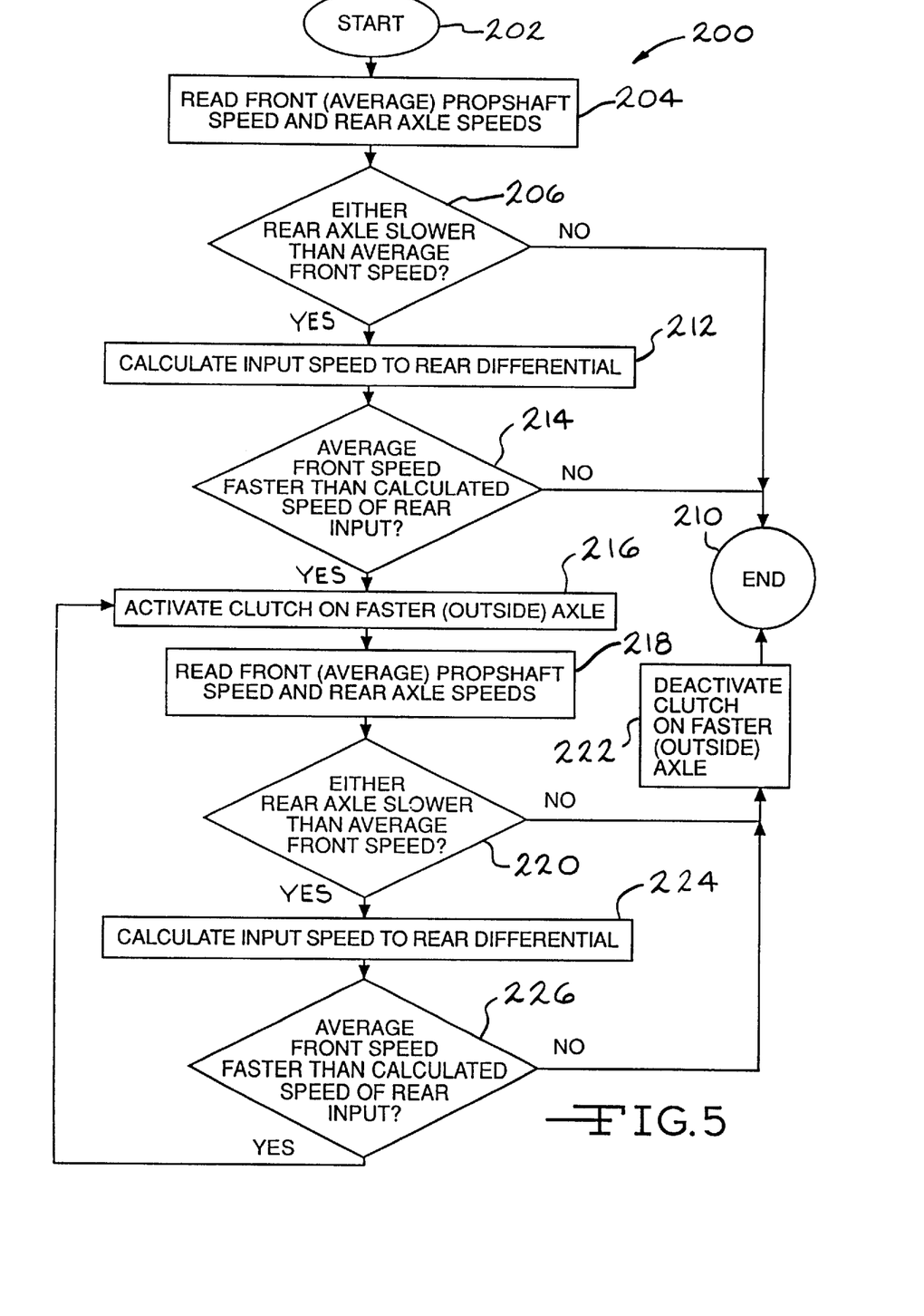
FIG. 5 is a software routine for controlling the dual clutch differential according to the present invention.

Referring now to FIG. 5, a software subroutine performed by a microprocessor 190 which may be utilized with the rear or secondary differential 34 according to the present invention is illustrated. The subroutine begins at an intializing or start step 202 which clears all previous data and zeros all registers such that computations, data storage and decisions may proceed. The subroutine 200 then proceeds to a process step 204 which reads the speed of the front or primary propshaft 20 and the speeds of each of the rear axles sensed by the sensor 164A and 164B. The primary driveline or propshaft speed may be either the computed average speed determined by reading left and right sensors and averaging the sensed speeds or read directly from a sensor associated with the front or primary drive shaft 20. In the driveline configuration illustrated, since both drive shafts 20 and 32 are driven by the bevel gear set 16, the sensor 56 may also be utilized as a source of this data. The subroutine 200 then moves to a decision point which determines whether either of the rear axles or output shafts 114A and 114B are turning slower than the computed or detected average front speed of the front or primary propshaft 20.

It should be noted that all computations and comparisons occurring within the subroutine 200 are based upon appropriate scaling factors being applied to the actually detected shaft speeds such that they are all properly comparable. That is, if the speed of a certain shaft is sensed at a location before, for example, speed reduction gearing and another shaft is sensed after a comparable speed reduction, an appropriate scaling factor can be applied to one or the other sensed speeds so that the two speeds may be readily compared.

If neither of the rear axles 114A or 114B are turning slower than the average speed of the front propshaft 20, the decision point 206 is exited at NO and the subroutine 200 terminates at an end point 210 and returns to an executive system or other master control loop or scheme in the microprocessor 190. If either of the rear axles 114A and 114B is turning slower than front propshaft 20, the decision point 206 is exited at YES and the subroutine 200 proceeds to a process step 212.

In the process step 212, a calculated input speed to the rear differential 34 is determined. This is achieved by averaging the speeds of the left and right output shafts 114A and 114B. The subroutine 200 then moves to a decision point 214 which the average front or propshaft speed is greater or faster than the calculated speed of the input of the rear differential 34. If the average front speed is not faster than the calculated rear speed input, the decision point 214 is exited at NO and the subroutine terminates at step 210. If the inquiry of decision point 214 is answered affirmatively, the subroutine 200 moves to a process step 216 which activates the respective modulating clutch assembly 90A or 90B associated with the faster turning axle 114A or 114B. This faster turning axle will be that axle on the outside of a turn. The subroutine 200 thus attempts to overcome the understeer tendency of a front wheel drive vehicle by adding torque to the outer rear wheel during a turn.

The precise extent of clutch activation, i.e., the percent of clutch activation will preferably be determined from variables such as the actual sensed speed difference and the time such speed difference has existed by virtue of the number of iterations that the subroutine 200 has undergone. Preferably the modulating clutch assembly 90A and 90B will be activated initially at some level preferably significantly less than 100%, for example 20%, and increased at a preselected ramp rate or in preselected increments of, for example 10%. The degree of clutch activation may also be simply a fixed number such as 40 percent or 50 percent which has been found to most suitably match the drive, vehicle and torque delivery dynamics of the particular vehicle and mechanical system involved.

The subroutine 200 then proceeds to a process step 218 which again reads the speed of the front or primary propshaft 20 and the speeds of each of the rear axles 114A and 114B sensed by the sensors 164A and 164B. The front driveline speed may be either the computed average speed determined by averaging left and right sensor readings or read directly from a sensor associated with the front prop shaft 20. The subroutine 200 then moves to a decision point 220 which determines whether either of the rear axles or output shafts 114A and 114B are turning slower than the computed or detected average front speed. If neither of the rear axles 114A or 114B are turning slower than the average speed of the front prop shaft, the decision point 220 is exited at NO and moves to a process step 222 which deactivates the particular modulating clutch assembly 90A and 90B previously activated. The subroutine 200 then terminates at an end point 210 and returns to an executive system or other master control loop in the microprocessor 190. If either of the rear axles 114A and 114B is turning slower than front prop shaft speed, the decision point 220 is exited at yes and the subroutine 200 proceeds to a process step 224.

In the process step 224, a calculated input speed to the rear differential 34 is again computed. The subroutine 200 then moves to a decision point 226 which reads the speed of the front or primary drive shaft 20 or computes the average front speed and determines whether it is faster than the calculated speed of the input of the rear differential 34. If the average front speed is not faster than the calculated rear speed input, the decision point 226 is exited at NO and the process step 222 is again reached which deactivates the previously activated one of the modulating clutch assemblies 90A or 90B. The subroutine 200 then terminates at step 210. If the inquiry of decision point 226 is answered affirmatively, the subroutine 200 returns to the process step 216 which further activates the modulating clutch assembly 90A or 90B associated with the faster turning axle 114A or 114B. Thus the subroutine 200 will iterate and make a further attempt to overcome the understeer tendency of the front wheel drive vehicle by adding additional torque to the outer rear wheel. It should be understood that the deactivating step of process step 222 may, like the activating process step 216 operate in stepped, incremental or ramped or similar fashion other than simply on-off.

The foregoing disclosure is the best mode devised by the inventor for practicing this invention. It is apparent, however, that apparatus and methods incorporating modifications and variations will be obvious to one skilled in the art of vehicle drivelines and differentials. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A differential for use in an adaptive fourwheel drive vehicle comprising, in combination, an input shaft, a drive member disposed perpendicularly to said input shaft, a gear set for transferring rotational energy from said input shaft to said drive member, a pair of output shafts aligned with said drive member and a pair of modulating clutch assemblies, each of said modulating clutch assemblies including a first plurality and a second plurality of interleaved clutch plates, a bell housing for engaging said first plurality of clutch plates, a collar for engaging said second plurality of clutch plates and an electromagnetic clutch operator, said pair of modulating clutch assemblies operably selectively coupling each of said output shafts with said drive member.

2. The differential of claim 1 wherein said first plurality of clutch plates is coupled to said drive member through said bell housing and said second plurality of clutch plates is coupled to one of said pair of output shafts through said collar.

3. The differential of claim 1 further including a tone wheel disposed for rotation with each of said pair of output shafts and a sensor disposed in sensing relationship with each of said tone wheels.

4. The differential of claim 1 wherein said modulating clutch assemblies each include a ball ramp operator having a pair of opposed circular members having complementarily configured opposed ramped recesses and rolling members disposed in said recesses whereby relative rotation of said members translates said members axially.

5. The differential of claim 1 wherein said drive member defines a hollow interior and includes fluid scavengers disposed for rotation with said drive member.

6. The differential of claim 5 wherein said output shafts define a hollow interior in fluid communication with said hollow interior of said drive member.

7. The differential of claim 1 wherein said input shaft includes an integrally formed bevel gear and said drive member includes a ring gear secured thereto.

8. A differential for use in an adaptive four-wheel drive vehicle comprising, in combination, a housing, an input shaft rotatably disposed in said housing, a drive member disposed in said housing, a gear set for transferring rotational energy from said input shaft to said drive member, a pair of output shafts aligned with said drive member and disposed for rotation in said housing, and a pair of modulating clutch assemblies each including an electromagnetic coil and a coil housing, one of said pair of modulating clutch assemblies disposed between and operably selectively coupling each of said output shafts with said drive member.

9. The differential of claim 8 wherein said modulating clutch assemblies each include a ball ramp operator having a pair of opposed circular members having complementarily configured opposed ramped recesses and rolling members disposed in said recesses whereby relative rotation of said members translate said members axially.

10. The differential of claim 8 further including a tone wheel disposed for rotation with each of said pair of output shafts and a sensor disposed in sensing relationship with each of said tone wheels.

11. The differential of claim 10 further including a microprocessor of controlling said pair of modulating clutches.

12. The differential of claim 8 wherein said gear set includes a pair of speed reducing bevel gears.

13. The differential of claim 8 wherein said modulating clutch assemblies include first and second pluralities of interleaved clutch plates, said first plurality of clutch plates operatively coupled to said drive member and said second plurality of clutch plates operatively coupled to one of said pair of output shafts.

14. A differential for an adaptive four-wheel drive vehicle comprising, in combination, an input shaft, a drive member defining an axis, a gear set for transferring rotational energy from said input shaft to said drive member, a pair of output shafts disposed for rotation about said axis, a pair of modulating clutch assemblies, said each of said modulating clutch assemblies including first and second pluralities of interleaved clutch plates and an electromagnetic operator, both of said first pluralities of clutch plates operatively coupled to said drive member and a respective one of said second plurality of clutch plates operatively coupled to a respective one of said pair of output shafts, whereby selective energization of said electromagnetic operators selectively couples said drive member and said output shafts.

15. The differential of claim 14 further including a tone wheel disposed for rotation with each of said pair of output shafts and a sensor disposed in sensing relationship with each of said tone wheels.

16. The differential of claim 14 wherein each of said modulating clutch assemblies includes a ball ramp operator having a pair of opposed members disposed for motion about said axis and having complementarily configured opposed ramped recesses and rolling members disposed in said opposed recesses whereby relative rotation of said members about said axis translates said members axially.

17. The differential of claim 14 wherein said drive member defines a hollow interior and includes a plurality of fluid scavengers adapted to collect and direct fluid to said hollow interior.

18. The differential of claim 17 wherein said output shafts define a hollow interior in fluid communication with said hollow interior of said drive member.

19. The differential of claim 14 wherein said input shaft includes an integrally formed bevel gear and said drive member includes a ring gear secured thereto.

* * * * *

UNITED STATES PATENT AND TRADEMARK OFFICE
Certificate

Patent No. 5,839,328                                             Patented: November 24, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dan J. Showalter, Plymouth, Michigan; and T. Mark Joslin, Howell, Michigan.

Signed and Sealed this Thirty-First Day of October, 2000.

CHARLES A. MARMOR
*Supervisory Patent Examiner*
Art Unit 3681